(12) United States Patent
Aitharaju et al.

(10) Patent No.: US 12,275,204 B2
(45) Date of Patent: Apr. 15, 2025

(54) COMPOSITE COMPONENTS AND MULTI-ZONE FIBER PREFORMS FOR COMPOSITE COMPONENTS

(71) Applicants: GM GLOBAL TECHNOLOGY OPERATIONS LLC, Detroit, MI (US); Coats American Inc, Marion, NC (US)

(72) Inventors: Venkateshwar R. Aitharaju, Troy, MI (US); Selina Xinyue Zhao, Rochester Hills, MI (US); George Han, Marion, NC (US); Colin Rowbottom, Marion, NC (US)

(73) Assignees: GM GLOBAL TECHNOLOGY OPERATIONS LLC, Detroit, MI (US); COATS AMERICAN INC, Marion, NC (US)

( * ) Notice: Subject to any disclaimer, the term of this patent is extended or adjusted under 35 U.S.C. 154(b) by 152 days.

(21) Appl. No.: 18/322,178

(22) Filed: May 23, 2023

(65) Prior Publication Data
US 2024/0391187 A1  Nov. 28, 2024

(51) Int. Cl.
*B29C 70/54* (2006.01)
*B29C 70/46* (2006.01)

(52) U.S. Cl.
CPC ............ *B29C 70/543* (2013.01); *B29C 70/46* (2013.01); *Y10T 428/24033* (2015.01)

(58) Field of Classification Search
None
See application file for complete search history.

(56) References Cited

U.S. PATENT DOCUMENTS

| | | |
|---|---|---|
| 7,819,462 B1 | 10/2010 | Owens |
| 8,033,592 B2 | 10/2011 | Hsu et al. |
| 2006/0106147 A1 | 5/2006 | Fasulo et al. |
| 2006/0199890 A1 | 9/2006 | Fasulo et al. |
| 2007/0299185 A1 | 12/2007 | Ottaviani et al. |
| 2010/0098925 A1 | 4/2010 | Fasulo et al. |

(Continued)

FOREIGN PATENT DOCUMENTS

| | | |
|---|---|---|
| DE | 10225954 A1 | 12/2003 |
| DE | 102012007005 A1 | 10/2013 |

(Continued)

OTHER PUBLICATIONS

German Office Action from counterpart 1020231304186, dated Nov. 15, 2024.

*Primary Examiner* — Alexander S Thomas (57) ABSTRACT

A method for fabricating a composite panel comprising stitching a plurality of first continuous reinforcing fibers in N first zones and M second zones of a backing substrate of a preform. The N first zones are arranged near C corners of the composite panel, where C is an integer. The plurality of first continuous reinforcing fibers in the N first zones is arranged radially relative to the C corners. At least one of a fiber density of the plurality of first continuous reinforcing fibers in the N first zones that is less than a fiber density of the plurality of first continuous reinforcing fibers in the M second zones, and a stitch density of the plurality of first continuous reinforcing fibers in the N first zones that is less than a stitch density of the plurality of first continuous reinforcing fibers in the M second zones.

20 Claims, 5 Drawing Sheets

(56) References Cited

U.S. PATENT DOCUMENTS

| | | |
|---|---|---|
| 2011/0121225 A1 | 5/2011 | Posudievsky et al. |
| 2022/0388210 A1 | 12/2022 | Guha et al. |
| 2023/0124757 A1* | 4/2023 | Akamatsu ............... B29C 70/24 428/297.4 |

FOREIGN PATENT DOCUMENTS

| | | |
|---|---|---|
| DE | 102022124197 A1 | 5/2023 |
| DE | 102023110208 A1 | 5/2024 |

* cited by examiner

COMPOSITE COMPONENTS AND MULTI-ZONE FIBER PREFORMS FOR COMPOSITE COMPONENTS

GOVERNMENT CLAUSE

This invention was made with government support under Grant No. DE-EE0009204 awarded by the U.S. Department of Energy. The Government has certain rights in this invention.

INTRODUCTION

The information provided in this section is for the purpose of generally presenting the context of the disclosure. Work of the presently named inventors, to the extent it is described in this section, as well as aspects of the description that may not otherwise qualify as prior art at the time of filing, are neither expressly nor impliedly admitted as prior art against the present disclosure.

The present disclosure relates to composite components, and more particularly to a method for forming composite components.

Vehicles include components such as battery covers, hoods, decklids, doors, fenders, liftgates, etc. For example, a battery cover may be used to cover a battery system including one or more battery cells. To reduce the weight of the vehicle, the components can be made of composite materials that include resin and reinforcing fibers such as carbon fiber, glass fiber, etc. The components may have complex shapes such as corners that are difficult to fabricate using composite materials without developing wrinkles or weak spots.

SUMMARY

A method for fabricating a composite panel comprising stitching a plurality of first continuous reinforcing fibers in N first zones and M second zones of a backing substrate of a preform, where N and M are integers greater than zero. The N first zones are arranged near C corners of the composite panel, where C is an integer. The plurality of first continuous reinforcing fibers in the N first zones is arranged radially relative to the C corners. At least one of a fiber density of the plurality of first continuous reinforcing fibers in the N first zones that is less than a fiber density of the plurality of first continuous reinforcing fibers in the M second zones, and a stitch density of the plurality of first continuous reinforcing fibers in the N first zones that is less than a stitch density of the plurality of first continuous reinforcing fibers in the M second zones.

In other features, at least two of the N first zones are arranged in the C corners. The N first zones have a polygonal shape. The stitch density in the N first zones is reduced by 50% to 100% relative to the M second zones. The fiber density in the N first zones is reduced by 15% to 75% relative to the M second zones. The preform includes T third zones including a plurality of second reinforcing fibers that are different than the plurality of first continuous reinforcing fibers, where T is an integer greater than zero. The method includes sensing a position of the preform in a molding tool using a position sensor configured to detect at least one of the T third zones.

In other features, the method includes using heating pads to heat regions of a molding tool near the N first zones. The method includes providing a molding tool including a binder, an upper punch, and a lower tool; arranging the preform between the binder and the upper punch and the lower tool; shaping the preform using the molding tool; and resin transfer molding the preform in the molding tool to create the composite panel.

In other features, the preform includes a peripheral edge portion and a central portion, the binder defines a second step, the central portion has a first thickness, the peripheral edge portion has a second thickness that is greater than the first thickness, and a first step is arranged between the central portion and the peripheral edge portion, wherein the second step of the binder engages the peripheral edge portion of the preform as the upper punch presses the preform to position the preform relative to the molding tool.

In other features, the method includes controlling the molding tool in response to sensing a location of the peripheral edge portion relative to the binder. The method includes positioning the plurality of first continuous reinforcing fibers in the N first zones and the M second zones using tailored fiber placement.

A preform for a composite panel comprises a backing substrate and a plurality of first continuous reinforcing fibers stitched to the backing substrate in N first zones and M second zones, where M and N are integers greater than zero. The N first zones are arranged in C corners of the composite panel, where C is an integer greater than zero. The plurality of first continuous reinforcing fibers in the N first zones are arranged radially relative to the C corners. At least one of a fiber density of the plurality of first continuous reinforcing fibers in the N first zones that is less than a fiber density of the plurality of first continuous reinforcing fibers in the M second zones, and a stitch density of the plurality of first continuous reinforcing fibers in the N first zones that is less than a stitch density of the plurality of first continuous reinforcing fibers in the M second zones.

In other features, each of the C corners includes at least two of the N first zones, and the N first zones have a polygonal shape. The stitch density in the N first zones is reduced by 50% to 100% relative to the M second zones, and the fiber density in the N first zones is reduced by 15% to 75% relative to the M second zones. The preform includes T third zones including second reinforcing fibers that are different than the plurality of first continuous reinforcing fibers, where T is an integer greater than zero.

A composite panel comprises a plurality of first continuous reinforcing fibers stitched to a backing substrate in N first zones and M second zones. The N first zones are arranged near C corners of the composite panel and the plurality of first continuous reinforcing fibers in the N first zones are arranged radially relative to the C corners. At least one of a fiber density of the plurality of first continuous reinforcing fibers in the N first zones that is less than a fiber density of the plurality of first continuous reinforcing fibers in the M second zones, and a stitch density of the plurality of first continuous reinforcing fibers in the N first zones that is less than a stitch density of plurality of first continuous reinforcing fibers in the M second zones. Resin encapsulates the backing substrate and the plurality of first continuous reinforcing fibers.

In other features, each of the C corners includes at least two of the N first zones, and the N first zones have a polygonal shape. The stitch density in the N first zones is reduced by 50% to 100% relative to the M second zones, and the fiber density in the N first zones is reduced by 15% to 75% relative to the M second zones. The composite panel includes T third zones including second reinforcing fibers that are different than the plurality of first continuous reinforcing fibers.

Further areas of applicability of the present disclosure will become apparent from the detailed description, the claims, and the drawings. The detailed description and specific examples are intended for purposes of illustration only and are not intended to limit the scope of the disclosure.

BRIEF DESCRIPTION OF THE DRAWINGS

The present disclosure will become more fully understood from the detailed description and the accompanying drawings, wherein.

In the drawings, reference numbers may be reused to identify similar and/or identical elements.

DETAILED DESCRIPTION

During manufacturing of a composite component such as a composite part or composite panel, a preform is prepared by stitching reinforcing fibers to a backing substrate in predetermined patterns in a plurality of zones. The preform is arranged in a tool, the preform is pressed using the tool, resin is injected into the tool, and the composite component is cured.

When the desired shape of the composite component is complex, the dry fiber preform may have wrinkles in corners or other locations with complex surfaces prior to the resin impregnation. During resin transfer molding, the wrinkles in the dry fiber preform may cause the resin to be blocked in certain areas of the composite component resulting in poor quality (e.g., dry fiber regions with insufficient resin wetting). In some examples, the preform is slit in corners or other areas with complex surfaces to prevent the wrinkles from occurring. However, the slits reduce strength in these areas and may require strengthening after resin transfer molding and curing. The process of strengthening the composite component is a manual operation that reduces throughput and increases cost.

Systems and methods for fabricating a composite component according to the present disclosure include a preform that includes continuous reinforcing fibers such as fiber tows that are stitched to a backing substrate in predetermined patterns in two or more zones. The composite component that is produced has reduced wrinkling in the corners or other areas with complex surfaces. The reduction of wrinkles is accomplished using predetermined fiber orientation in one or more of the zones near the complex surfaces, reducing fiber density in the one or more zones near the complex surfaces, and/or reducing stitch density near the one or more zones near the complex surfaces to reduce wrinkles and resin blocking during injection resin transfer molding.

In some examples, the preforms include patches including different types of reinforcing fibers. The patches have a different density that can be sensed by a sensor such as an ultrasonic sensor during draping in the molding tool and prior to injection of resin. In some examples, the preform also includes a peripheral edge portion defining a step with increased thickness that is used to position the preform in the tool as the tool is closed.

In some examples, the molding tool includes a stationary lower tool and an upper punch and a binder that are moveable relative to the lower tool. The binder defines a step to provide a surface to engage and bias the peripheral edge portion of the preform to center the preform in the molding tool as the binder and/or the upper punch are lowered. In some examples, the binder tool includes one or more distance sensors to monitor the thickness of the preform and/or position sensors to confirm alignment of the preform in the molding tool prior to pressing the preform. Improperly positioned preforms in the molding tool directly leads to scrap and waste. The upper punch includes passages to allow resin to impregnate the preform after the preform is positioned and formed and/or heaters in regions that are prone to wrinkling.

Figure 1:
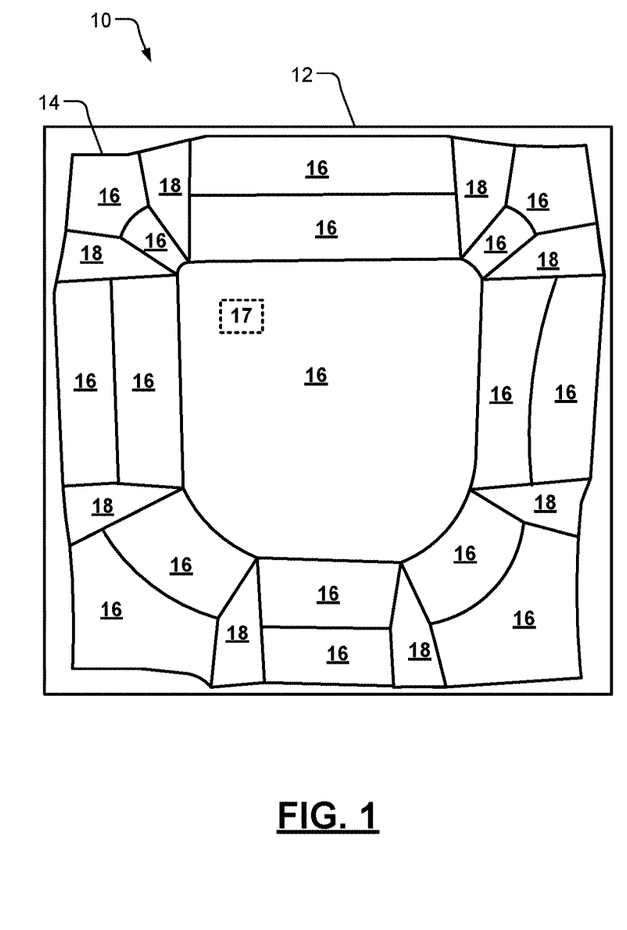
FIG. 1 is a plan view of a preform including a backing substrate and reinforcing fibers arranged in predetermined patterns in a plurality of zones according to the present disclosure.
Figure 2:
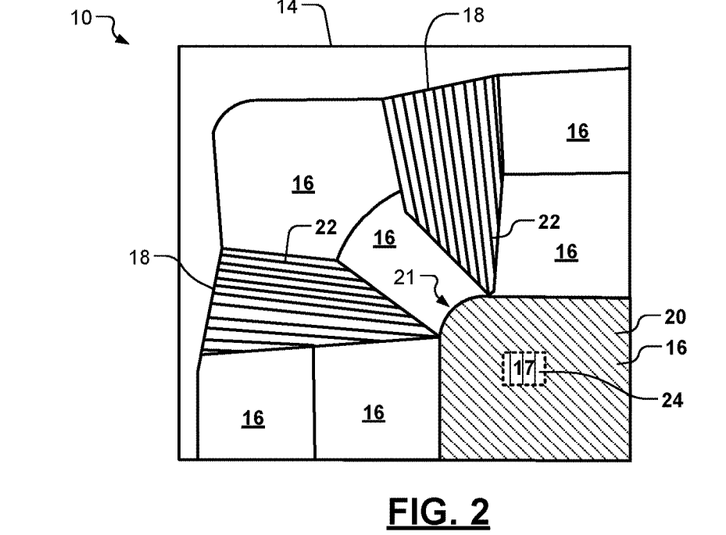
FIG. 2 is an enlarged plan view of a preform including a backing substrate and reinforcing fibers arranged in predetermined patterns in a plurality of zones according to the present disclosure.
Figure 3:
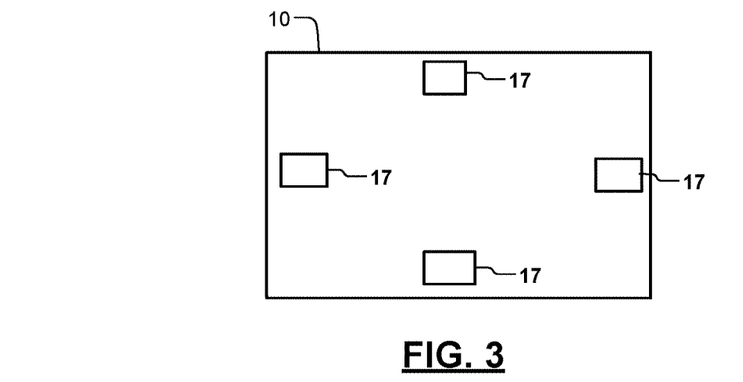
FIG. 3 is a plan view of an example of a preform including zones that are used for positioning of the preform in the molding tool according to the present disclosure.

Referring now to FIGS. 1 to 3, an example of a preform 10 is shown. The preform 10 includes a backing substrate 12 and continuous reinforcing fibers 20, 22 (e.g., such as fiber tows) that are stitched to the backing substrate 12 in zones 16, 18, respectively. The zones 18 are arranged near corners or other complex surfaces (e.g., radially outside of corner 21 in FIG. 2) where wrinkles are likely to occur. The zones 16 are arranged in a middle portion of the composite component and/or other regions that are located spaced from the complex shapes. In some examples, the zones 16 and 18 include the same or different types of continuous reinforcing fibers 20. In some examples, the zones 18 have a polygon shape (e.g., a polygon shape or polygonal shape with rounded corners) or another shape and are located near corners or other complex surfaces. In some examples, 2 to 3 of the zones 18 are arranged at corners or other complex surfaces of the composite component.

In some examples, the zones 18 include the continuous reinforcing fibers 22 arranged in a radial pattern and discontinuous fibers arranged across the continuous fibers in a circumferential direction. The continuous reinforcing fibers 22 in the zones 18 are oriented in a direction that is different than the orientation of the continuous reinforcing fibers 20 in the zones 16. In some examples, the continuous reinforcing fibers 22 in the zones 18 are oriented parallel to a direction that wrinkles are likely to occur. In some examples, the continuous reinforcing fibers 22 in the zones 18 are oriented in an approximately radial direction relative to the corner 21 (FIG. 2). For example, the continuous reinforcing fibers 22 in the zone 18 radially outside of the corner 21 are aligned approximately parallel to a vertical radial line extending from a radius of the corner 21. For example, the continuous reinforcing fibers 22 in the zone 18 arranged at a side of the corner 21 are aligned approximately parallel to a horizontal radial line extending from a radius of the corner 21. As used in this context, approximately means within +/−20°.

In some examples, the zones 18 have reduced fiber density (fiber volume in the zone divided by total volume of zone including the resin and the fibers) as compared to the zones 16. In some examples, the fiber density in the zones 18 is reduced by 15% to 75% relative to the zones 16. Reduced fiber density allows the fibers to aggregate and adapt to the complex surfaces, which reduces wrinkles. In some examples, the zones 18 have reduced stitch density as compared to the zones 16. In some examples, the stitch density in the zones 18 is reduced by 50% to 100% of the zones 16. Reduced stitch density allows increased freedom of movement of fibers in the zones, which reduces wrinkles and resin blockage.

In some examples, the backing substrate 12 includes a polymer with a relatively lower melting point (e.g., a melting point less than 115° C.) to allow melting of the backing substrate 12 in intended areas of the preform. In some examples, polyethylene (melting at 105° C. to 115° C.) or polycaprolactone (melting at 58° C. to 62° C.) are used. Heating pads can be arranged on the tool near the complex surfaces to ensure that these areas are sufficiently heated to ensure uniformity.

In some examples, the preform 10 further includes one or more zones 17 that include reinforcing fibers 24 that are different than the reinforcing fibers used in the zones 16 and 18. The reinforcing fibers 24 produce a distinct impedance that can be detected by sensors in the molding tool. For example, if the zones 16 and 18 use glass fibers, the zone 17 can use carbon, basalt or any other type of reinforcing fibers. For example, if the zones 16 and 18 use carbon fibers, the zone 17 can use glass, basalt or any other type of reinforcing fibers. In some examples, the molding tool includes a position sensor such as an ultraviolet sensor to allow the molding tool to sense the position of the preform 10 in the molding tool. As the preform 10 is arranged on the tool, the sensors detect the zones 17 to confirm alignment or provide feedback to allow the preform 10 position to be adjusted in the tool prior to resin transfer molding. In some examples, the zones 17 are square or round and have sides or a diameter that is in a range from 3 mm to 25 mm.

Figure 4:
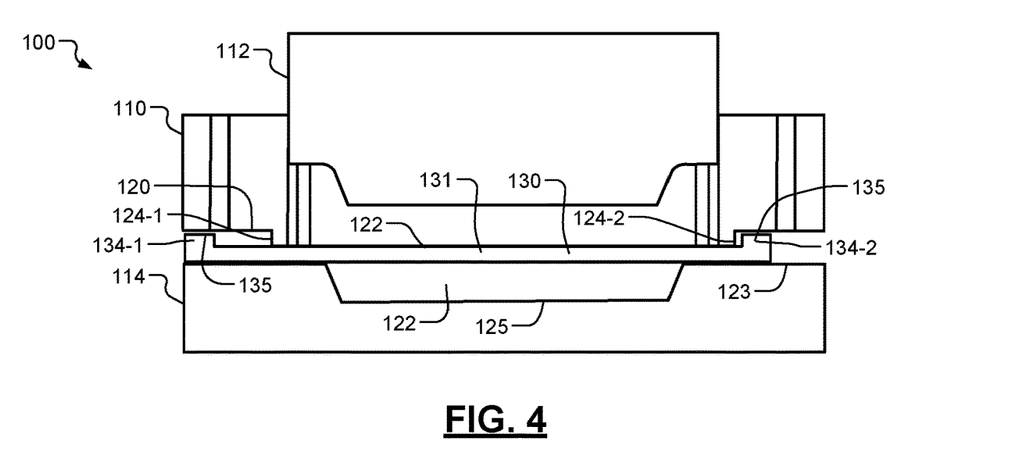
FIGS. 4 to 6 are side cross-sectional views of an example of a tool including an upper punch, a lower tool, and a binder according to the present disclosure.
Figure 5:
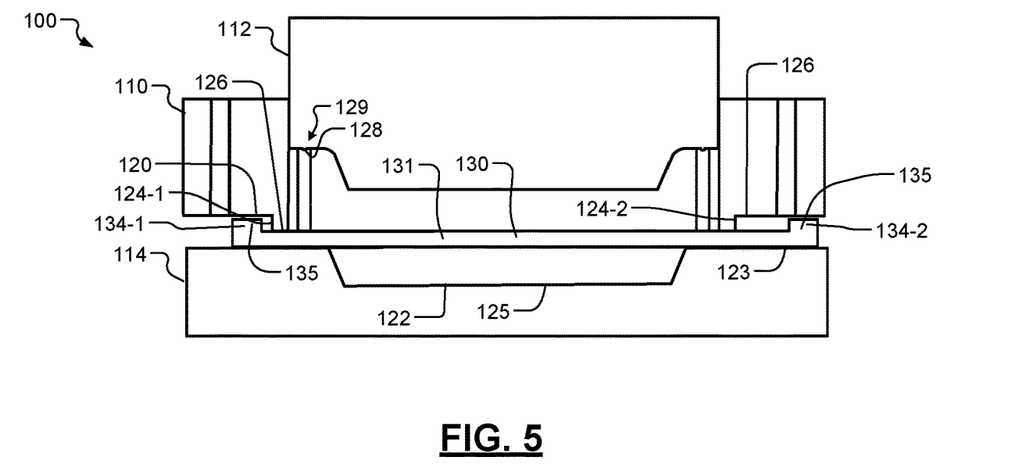
Figure 6:
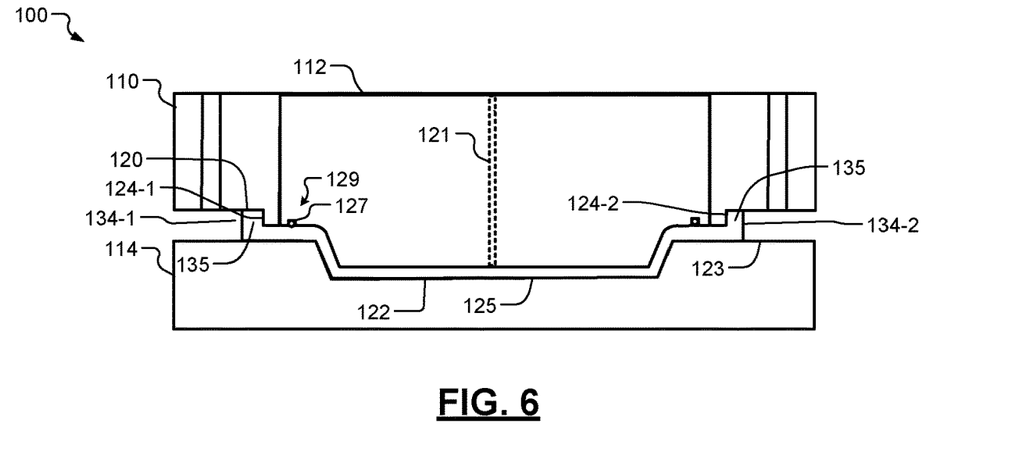

Referring now to FIGS. 4 to 6, an example of an resin transfer molding tool is shown. In FIG. 4, a tool 100 performs both preforming and molding. The tool 100 includes an upper punch 112, a lower tool 114, and a binder 110. The lower tool 114 defines a cavity 122 on an upwardly facing surface thereof. While the cavity 122 is shown with a fixed depth and upper edges 123 and lower edges 125 that are parallel, the cavity 122 may have any shape and may have a variable height along the upper edge 123, a variable depth along the lower edge 125 and/or side surfaces with different heights, curvatures and/or profiles.

The binder 110 is vertically moveable relative to the upper punch 112 and the lower tool 114. The upper punch 112 is vertically moveable relative to the binder 110 and the lower tool 114. The binder 110 includes a lower surface defining a radially inner portion 126 and a step 120. The step 120 defines a radially outwardly facing surfaces 124-1 and 124-2. The radially inner portion 126 extends below the step 120. A preform 130 to be processed by the tool 100 includes a body with a center portions 131 having a first thickness and peripheral edge portions 134-1 and 134-2 defining steps 135 and having a second thickness that is greater than the first thickness.

In FIGS. 4 and 5, positioning of the preform 130 on the tool 100 is less critical due to self-aligning features. In other words, the preform 130 can be located in non-central locations (to the left in FIG. 4 or to the right in FIG. 5). As the upper punch 112 moves downwardly, the outer edges 134-1 and 134-2 and radially outwardly facing surfaces 124-1 and 124-2 center the preform 130 relative to the tool 100. In FIG. 6, the upper punch 112 is seated against the preform 130 and the lower tool 114 where injection of resin and curing may be performed.

In some examples, the preform 130 is impregnated with resin during a predetermined impregnation period and then cured during a predetermined curing period. In some examples, the upper punch 112 includes one or more passages 121 allow resin to be injected at one or more locations to impregnate the preform 130 with resin. In some examples, the upper punch 112 includes a seal 129 such as an annular projection 128 (shown in FIG. 5) or O-ring 127 arranged in a groove (shown in FIG. 6) in a bottom surface of the upper punch 112 facing the preform 130 radially outside of a trim line where excess material is cutoff.

When designing the preform 130 for a desired component geometry, a detailed draping analysis is performed to determine draw-in amounts that are needed across various sections of the preform 130. The step of the binder 110 helps to position the preform 130 relative to the tool 100. In some examples, the step of the binder 110 has a height of 6-12 mm. In addition, the preform 130 is designed with peripheral edge portions 134-1 and 134-2 defining a step located at a distance from the step 120 in the binder 110 (prior to pressing) that is equal to a desired draw-in amount.

Using tailored fiber placement (TFP), the preform 130 is manufactured with reinforcing fibers arranged in zones as described above. The increase in thickness at the steps is achieved either by using a higher volume of fibers or stitching over an incompressible material in the preform. In some examples, the thickness increase of the peripheral edge portions 134-1 and 134-2 relative to the center portions 131 of the preform 130 is in a range from 5% to 100% of a nominal thickness in the central portion. In some examples, the thickness at the outer edge is in a range from 1 to 4 mm greater than the nominal thickness. In some examples, the thickness at the outer edge is in a range from 2 to 3 mm greater than the nominal thickness.

In some examples, the preform 130 is loaded into the tool 100 using a robot (see FIGS. 9 and 10 described further below). The binder 110 is moved down to hold the preform 130. Very low tonnage force is applied by the binder 110 to hold the preform 130. Then, the upper punch 112 is moved downwardly towards the lower tool 114 and closes the tool 100. During this process, the preform 130 draws, slips past the binder 110, and stops when the peripheral edge of the preform 130 is located against the step 120 of the binder 110.

In some examples, when the preform 130 draws into the cavity 122 by a predetermined amount, the peripheral edge of the preform 130 is located under a distance sensor or position sensor. When the distance sensor senses the higher thickness of the peripheral edge and/or the position sensors sense the zones 17 in the correct locations, subsequent stage(s) of forming (e.g., molding, curing, etc.) are performed. Ensuring that the preform is correctly positioned will likely reduce scrap to 0%. Additional details relating to the molding tool can be found in commonly assigned U.S. patent application Ser. No. 17/977,083, entitled "PREFORM WITH VARIABLE FIBER DENSITY, FORMING AND MOLDING TOOL AND METHOD FOR FORMING OF COMPOSITE MATERIALS", filed on Oct. 31, 2022, which is hereby incorporated by reference in its entirety.

Figure 7:
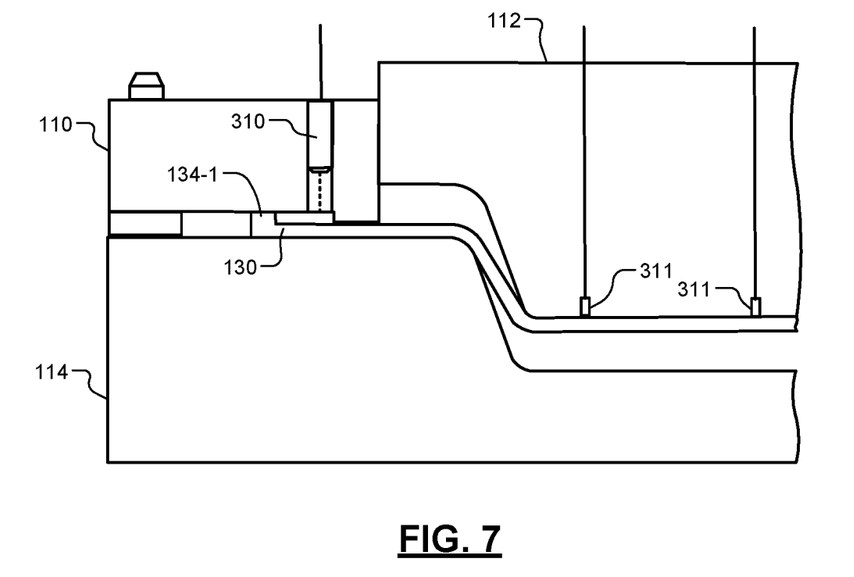
FIGS. 7 and 8 are side cross-sectional views of an example of a tool including a distance sensor and/or a position sensor according to the present disclosure.
Figure 8:
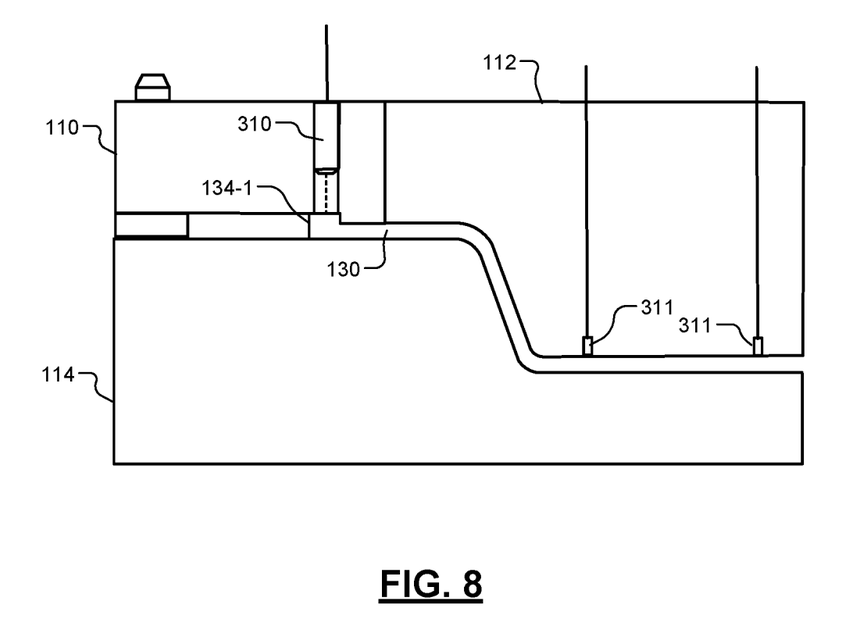

Referring now to FIGS. 7 and 8, in some examples the binder 110 optionally includes one or more distance sensors 310 and/or one or more position sensors 311 to sense when the preform 130 is located correctly. The distance sensor 310 may be arranged radially outside of the step of the binder 110. As the preform 130 is drawn into the tool in FIG. 7, one or both peripheral edges are located against the step 120 of the binder 110 to center the preform 130 relative to the cavity. The position sensors 311 are located in positions corresponding to the zones 17 of the preform 10.

Figure 9:
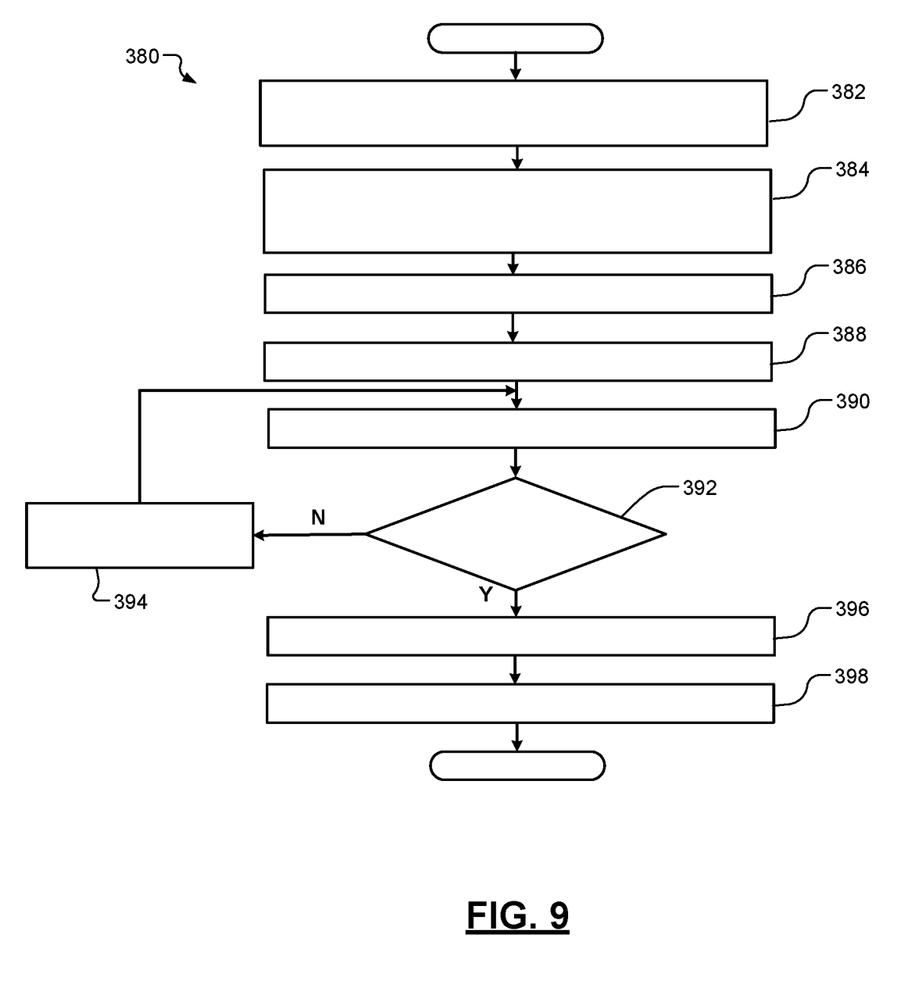
FIG. 9 is a flowchart of an example of a method for creating a preform and an resin transfer molding a composite component according to the present disclosure.

Referring now to FIG. 9, a method 380 for manufacturing a preform is shown. At 382, zones are defined at one or more locations of a preform corresponding to locations with complex surfaces (e.g., zones 18), main zones (e.g. zones 16), and optional positioning sensor zones (e.g., zones 17). At 384, different volume fractions of reinforcing fibers, fiber orientations, and/or stitch densities are defined in the different zones using tailored fiber placement as described herein.

At 386, discontinuous fibers can be arranged on the fiber preform. For example, the discontinuous fibers in the first zones can be arranged in the same direction or a different direction (e.g., in a perpendicular direction) relative to the continuous reinforcing fibers in the first zones. At 388, the preform 10 is arranged in the molding tool. At 390, the distance and/or position sensors are used to confirm the location of the preform in the tool. At 392, the method determines whether the position of the preform in the tool is correct. If 392 is false, the position of the preform is adjusted at 394. If 392 is true, the preform 10 is pressed in the tool and resin is injected and cured at 396.

Figure 10:
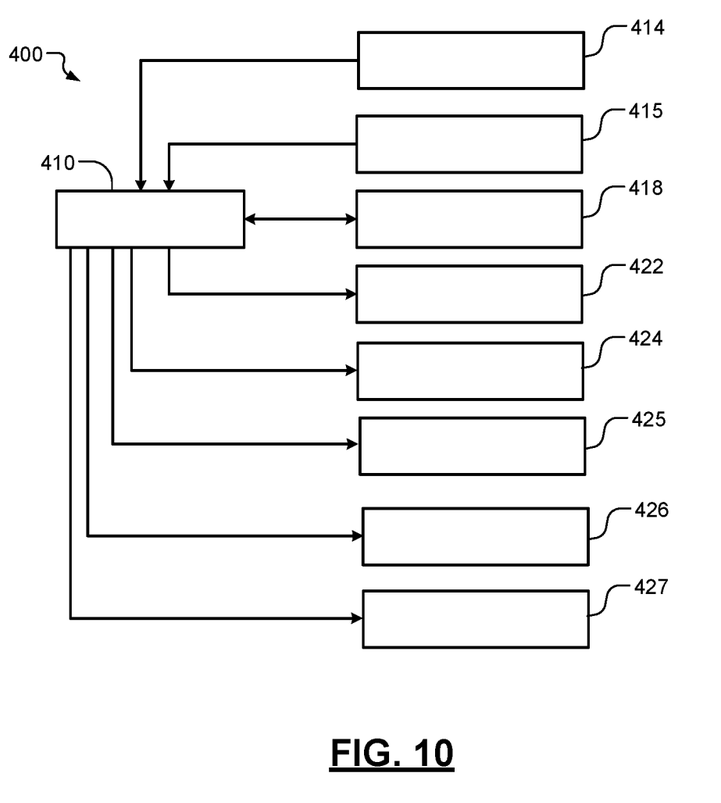
FIG. 10 is a functional block diagram of an example of a tool control system according to the present disclosure.

Referring now to FIG. 10, a tool control system 400 includes a controller 410 that receives an output of one or more distance sensors 414 and/or one or more position sensors 415. In some examples, the one or more position sensors include ultrasonic sensors. The controller 410 controls a heater 424 to heat the tool 100. In some examples, the heater 424 heats the tool to a temperature in a range from 90° C. to 130° C. In some examples, heating pads 427 are arranged near complex surfaces of the composite component to allow separate temperature control in locations of the tool near one or more of the zones (e.g., zones 18). For example, the heater 424 may heat these regions to have a temperature that is higher than other zones. The controller 410 may receive output(s) of one or more temperature sensors 425 that sense a temperature of the tool 100 in one or more zones.

The controller 410 causes a robot 426 to load the preform 130 between the upper punch 112 and the lower tool 114. The controller 410 initiates movement of the binder 110 (to lightly engage the preform 130) and the upper punch 112 using tool positioning devices 418. When the distance sensors 310 sense that the preform 130 is positioned correctly, the controller 410 causes the upper punch 112 to move to a final position.

Then, the controller 410 initiates injection using a resin injection mixhead 422. After a curing period, the controller 410 causes the tool positioning devices 418 to move the upper punch 112 and the binder 110 upwardly. Then, the controller 410 causes the robot 426 to remove the preform 130 from the tool 100. The controller 410 then repeats the process or ends the process.

The method for manufacturing a composite component described herein produces composite components with no wrinkles at high throughput. The method eliminates weak spots that may occur caused by slits or other approaches without requiring manual strengthening. The method presented is also automation friendly, which reduces cost.

The foregoing description is merely illustrative in nature and is in no way intended to limit the disclosure, its application, or uses. The broad teachings of the disclosure can be implemented in a variety of forms. Therefore, while this disclosure includes particular examples, the true scope of the disclosure should not be so limited since other modifications will become apparent upon a study of the drawings, the specification, and the following claims. It should be understood that one or more steps within a method may be executed in different order (or concurrently) without altering the principles of the present disclosure. Further, although each of the embodiments is described above as having certain features, any one or more of those features described with respect to any embodiment of the disclosure can be implemented in and/or combined with features of any of the other embodiments, even if that combination is not explicitly described. In other words, the described embodiments are not mutually exclusive, and permutations of one or more embodiments with one another remain within the scope of this disclosure.

Spatial and functional relationships between elements (for example, between modules, circuit elements, semiconductor layers, etc.) are described using various terms, including "connected," "engaged," "coupled," "adjacent," "next to," "on top of," "above," "below," and "disposed." Unless explicitly described as being "direct," when a relationship between first and second elements is described in the above disclosure, that relationship can be a direct relationship where no other intervening elements are present between the first and second elements, but can also be an indirect relationship where one or more intervening elements are present (either spatially or functionally) between the first and second elements. As used herein, the phrase at least one of A, B, and C should be construed to mean a logical (A OR B OR C), using a non-exclusive logical OR, and should not be construed to mean "at least one of A, at least one of B, and at least one of C."

In the figures, the direction of an arrow, as indicated by the arrowhead, generally demonstrates the flow of information (such as data or instructions) that is of interest to the illustration. For example, when element A and element B exchange a variety of information, but information transmitted from element A to element B is relevant to the illustration, the arrow may point from element A to element B. This unidirectional arrow does not imply that no other information is transmitted from element B to element A. Further, for information sent from element A to element B, element B may send requests for, or receipt acknowledgements of, the information to element A.

In this application, including the definitions below, the term "module" or the term "controller" may be replaced with the term "circuit." The term "module" may refer to, be part of, or include: an Application Specific Integrated Circuit (ASIC); a digital, analog, or mixed analog/digital discrete circuit; a digital, analog, or mixed analog/digital integrated circuit; a combinational logic circuit; a field programmable gate array (FPGA); a processor circuit (shared, dedicated, or group) that executes code; a memory circuit (shared, dedicated, or group) that stores code executed by the processor circuit; other suitable hardware components that provide the described functionality; or a combination of some or all of the above, such as in a system-on-chip.

The module may include one or more interface circuits. In some examples, the interface circuits may include wired or wireless interfaces that are connected to a local area network (LAN), the Internet, a wide area network (WAN), or combinations thereof. The functionality of any given module of the present disclosure may be distributed among multiple modules that are connected via interface circuits. For example, multiple modules may allow load balancing. In a further example, a server (also known as remote, or cloud) module may accomplish some functionality on behalf of a client module.

The term code, as used above, may include software, firmware, and/or microcode, and may refer to programs, routines, functions, classes, data structures, and/or objects. The term shared processor circuit encompasses a single processor circuit that executes some or all code from multiple modules. The term group processor circuit encompasses a processor circuit that, in combination with additional processor circuits, executes some or all code from one or more modules. References to multiple processor circuits encompass multiple processor circuits on discrete dies, multiple processor circuits on a single die, multiple cores of a single processor circuit, multiple threads of a single processor circuit, or a combination of the above. The term shared memory circuit encompasses a single memory circuit that stores some or all code from multiple modules. The term group memory circuit encompasses a memory circuit that, in combination with additional memories, stores some or all code from one or more modules.

The term memory circuit is a subset of the term computer-readable medium. The term computer-readable medium, as used herein, does not encompass transitory electrical or electromagnetic signals propagating through a medium (such as on a carrier wave); the term computer-readable medium may therefore be considered tangible and non-transitory. Non-limiting examples of a non-transitory, tangible computer-readable medium are nonvolatile memory circuits (such as a flash memory circuit, an erasable programmable read-only memory circuit, or a mask read-only memory circuit), volatile memory circuits (such as a static random access memory circuit or a dynamic random access memory circuit), magnetic storage media (such as an analog or digital magnetic tape or a hard disk drive), and optical storage media (such as a CD, a DVD, or a Blu-ray Disc).

The apparatuses and methods described in this application may be partially or fully implemented by a special purpose computer created by configuring a general-purpose computer to execute one or more particular functions embodied in computer programs. The functional blocks, flowchart components, and other elements described above serve as software specifications, which can be translated into the computer programs by the routine work of a skilled technician or programmer.

The computer programs include processor-executable instructions that are stored on at least one non-transitory, tangible computer-readable medium. The computer programs may also include or rely on stored data. The computer programs may encompass a basic input/output system (BIOS) that interacts with hardware of the special purpose computer, device drivers that interact with particular devices of the special purpose computer, one or more operating systems, user applications, background services, background applications, etc.

The computer programs may include: (i) descriptive text to be parsed, such as HTML (hypertext markup language), XML (extensible markup language), or JSON (JavaScript Object Notation) (ii) assembly code, (iii) object code generated from source code by a compiler, (iv) source code for execution by an interpreter, (v) source code for compilation and execution by a just-in-time compiler, etc. As examples only, source code may be written using syntax from languages including C, C++, C#, Objective-C, Swift, Haskell, Go, SQL, R, Lisp, Java®, Fortran, Perl, Pascal, Curl, OCaml, Javascript®, HTML5 (Hypertext Markup Language 5th revision), Ada, ASP (Active Server Pages), PHP (PHP: Hypertext Preprocessor), Scala, Eiffel, Smalltalk, Erlang, Ruby, Flash®, Visual Basic®, Lua, MATLAB, SIMULINK, and Python®.

What is claimed is:

1. A method for fabricating a composite panel comprising:
    stitching a plurality of first continuous reinforcing fibers in N first zones and M second zones of a backing substrate of a preform, where N and M are integers greater than zero,
    wherein the N first zones are arranged near C corners of the composite panel, where C is an integer, and
    wherein the plurality of first continuous reinforcing fibers in the N first zones is arranged radially relative to the C corners, and
    wherein at least one of:
        a fiber density of the plurality of first continuous reinforcing fibers in the N first zones that is less than a fiber density of the plurality of first continuous reinforcing fibers in the M second zones, and
        a stitch density of the plurality of first continuous reinforcing fibers in the N first zones that is less than a stitch density of the plurality of first continuous reinforcing fibers in the M second zones.

2. The method of claim 1, wherein at least two of the N first zones are arranged in the C corners.

3. The method of claim 1, wherein the N first zones have a polygonal shape.

4. The method of claim 1, wherein the stitch density in the N first zones is reduced by 50% to 100% relative to the M second zones.

5. The method of claim 1, wherein the fiber density in the N first zones is reduced by 15% to 75% relative to the M second zones.

6. The method of claim 1, wherein the preform includes T third zones including a plurality of second reinforcing fibers that are different than the plurality of first continuous reinforcing fibers, where T is an integer greater than zero.

7. The method of claim 6, further comprising sensing a position of the preform in a molding tool using a position sensor configured to detect at least one of the T third zones.

8. The method of claim 1, further comprising using heating pads to heat regions of a molding tool near the N first zones.

9. The method of claim 1, further comprising:
    providing a molding tool including a binder, an upper punch, and a lower tool;
    arranging the preform between the binder and the upper punch and the lower tool;
    shaping the preform using the molding tool; and
    resin transfer molding the preform in the molding tool to create the composite panel.

10. The method of claim 9, wherein:
    the preform includes a peripheral edge portion and a central portion,
    the binder defines a second step,
    the central portion has a first thickness,
    the peripheral edge portion has a second thickness that is greater than the first thickness, and
    a first step is arranged between the central portion and the peripheral edge portion, wherein the second step of the binder engages the peripheral edge portion of the preform as the upper punch presses the preform to position the preform relative to the molding tool.

11. The method of claim 10, further comprising controlling the molding tool in response to sensing a location of the peripheral edge portion relative to the binder.

12. The method of claim 1, further comprising positioning the plurality of first continuous reinforcing fibers in the N first zones and the M second zones using tailored fiber placement.

13. A preform for a composite panel comprising:
a backing substrate; and
a plurality of first continuous reinforcing fibers stitched to the backing substrate in N first zones and M second zones, where M and N are integers greater than zero,
wherein the N first zones are arranged in C corners of the composite panel, where C is an integer greater than zero,
wherein the plurality of first continuous reinforcing fibers in the N first zones are arranged radially relative to the C corners, and
wherein at least one of:
a fiber density of the plurality of first continuous reinforcing fibers in the N first zones that is less than a fiber density of the plurality of first continuous reinforcing fibers in the M second zones, and
a stitch density of the plurality of first continuous reinforcing fibers in the N first zones that is less than a stitch density of the plurality of first continuous reinforcing fibers in the M second zones.

14. The preform of claim 13, wherein:
each of the C corners includes at least two of the N first zones, and
the N first zones have a polygonal shape.

15. The preform of claim 13, wherein:
the stitch density in the N first zones is reduced by 50% to 100% relative to the M second zones, and
the fiber density in the N first zones is reduced by 15% to 75% relative to the M second zones.

16. The preform of claim 13, wherein the preform includes T third zones including second reinforcing fibers that are different than the plurality of first continuous reinforcing fibers, where T is an integer greater than zero.

17. A composite panel comprising:
a plurality of first continuous reinforcing fibers stitched to a backing substrate in N first zones and M second zones,
wherein the N first zones are arranged near C corners of the composite panel and the plurality of first continuous reinforcing fibers in the N first zones are arranged radially relative to the C corners, and
wherein at least one of:
a fiber density of the plurality of first continuous reinforcing fibers in the N first zones that is less than a fiber density of the plurality of first continuous reinforcing fibers in the M second zones, and
a stitch density of the plurality of first continuous reinforcing fibers in the N first zones that is less than a stitch density of plurality of first continuous reinforcing fibers in the M second zones; and
resin encapsulating the backing substrate and the plurality of first continuous reinforcing fibers.

18. The composite panel of claim 17, wherein:
each of the C corners includes at least two of the N first zones, and
the N first zones have a polygonal shape.

19. The composite panel of claim 17, wherein:
the stitch density in the N first zones is reduced by 50% to 100% relative to the M second zones, and
the fiber density in the N first zones is reduced by 15% to 75% relative to the M second zones.

20. The composite panel of claim 17, wherein the composite panel includes T third zones including second reinforcing fibers that are different than the plurality of first continuous reinforcing fibers.

* * * * *